US00RE35375E

United States Patent [19]

Park

[11] E Patent Number: Re. 35,375

[45] Reissued Date of Patent: Nov. 5, 1996

[54] MOVABLE TOY

[76] Inventor: Dal H. Park, 5-201, Mujige APT, Seocho-dong, Seoul, Rep. of Korea

[21] Appl. No.: 243,586

[22] Filed: May 16, 1994

Related U.S. Patent Documents

Reissue of:

[64] Patent No.: 5,221,226
Issued: Jun. 22, 1993
Appl. No.: 570,333
Filed: Aug. 21, 1990

U.S. Applications:

[63] Continuation-in-part of Ser. No. 458,225, Dec. 28, 1989, abandoned.

[30] Foreign Application Priority Data

Nov. 9, 1989 [KR] Rep. of Korea ..... 89-16604

[51] Int. Cl.[6] ..... A63H 11/02

[52] U.S. Cl. ..... 446/353; 446/484

[58] Field of Search ..... 446/353, 484, 446/354, 355, 356, 3, 901, 369, 295

[56] References Cited

U.S. PATENT DOCUMENTS

| | | | |
|---|---|---|---|
| 1,654,336 | 12/1927 | Linstrom | 446/353 |
| 3,234,933 | 2/1966 | Martin | 128/36 |
| 3,530,617 | 9/1970 | Halvorson et al. | 446/484 |
| 4,219,957 | 9/1980 | Kakuta | 446/3 X |
| 4,413,442 | 11/1983 | McSweeney | 446/901 X |
| 4,718,876 | 1/1988 | Lee | 446/295 |
| 4,802,463 | 2/1989 | Rojas | 128/36 |
| 4,867,726 | 9/1989 | Fujimaki | 446/353 X |

*Primary Examiner*—Mickey Yu
*Attorney, Agent, or Firm*—Michael N. Meller

[57] ABSTRACT

A movable toy having a vibrator arrangement adapted to be mounted in a toy body. The vibrator includes one or more vibrating elements eccentrically mounted on the shaft of a motor that is energized into rotation by a switch. The rotation of the eccentrically mounted vibrating element causes the toy to vibrate and move in different directions depending on how the vibrator is mounted in the toy body. The toy body has an outer portion in which is embedded dyed artificial hair. The bottom portion of the toy body is made of a smooth material for ease of movement of the toy along a contacting surface.

12 Claims, 5 Drawing Sheets

MOVABLE TOY

Matter enclosed in heavy brackets [ ] appears in the original patent but forms no part of this reissue specification; matter printed in italics indicates the additions made by reissue.

This application is a continuation-in-part application of U.S. patent application Ser. No. 458,225 filed Dec. 8, 1989, abandoned.

FIELD AND BACKGROUND OF THE INVENTION

This invention relates to a movable toy, and more particularly to a movable soft toy that includes vibrating means and can be vibrated or moved in a predetermined direction.

Most consumers prefer a movable toy to an immovable toy because a movable toy such as a toy animal can be moved forward or backward while vibrating as if alive. For the purpose of making a toy vibrate or move in a predetermined direction, the toy has to be provided with a mechanical device.

Conventional mechanical devices, which are housed within the toy body, generally consist of a plurality of gears interconnected with a drive mechanism through a pulley and a belt. Such toy can be vibrated at a stationary position, or moved forward or backward in a predetermined direction in response to the operation of the drive mechanism.

However, the conventional mechanical device is generally composed of a plurality of various components and its operating mechanism is complicated. It is therefore burdensome to manufacture or assemble the components, which increases manufacturing cost to lower competitive power in the commercial market.

Moreover, since such conventional mechanical device is adapted to be installed only within a toy having a body made of some hard material, such as a steel plate or a synthetic resin, it is difficult to mount the mechanical device within a toy body made of soft material like cloth or rubber.

SUMMARY OF THE INVENTION

It is the principal object of the present invention to provide a movable toy which can be vibrated or moved in a predetermined direction in response to the vibration of a vibrating member mounted eccentrically on a motor shaft within the body of the toy.

It is another object of the present invention to provide a movable toy which can be vibrated or moved forwards and backwards in response to the vibration of vibrating members eccentrically mounted on the both sides of the motor shaft.

A movable toy, in accordance with the first embodiment of the present invention comprises a toy body and a vibrator. The vibrator has an upper cover and a lower cover and is mounted within the toy body. The vibrator includes a push member with a push plate on one end thereof. A push button switch mechanism is installed in a passthrough opening in the upper cover of the vibrator. A battery housing adapted to receive a battery is located within the covers of the vibrator as is a motor adapted to be energized into rotation by operation of the switch. A vibrating member is eccentrically mounted on the one side of the shaft of the motor.

A movable toy in accordance with another feature of the present invention includes a toy body and a vibrator mounted within the toy body. The toy body has an outer portion in which is embedded dyed artificial hair and a bottom portion having an inner surface and an outer surface. The outer surface is made of smooth material for ease of movement of the toy along a contacting surface. The toy body has a head formed with a preselected animal mask.

BRIEF DESCRIPTION OF THE DRAWINGS

A particular preferred embodiment of the invention will now be described, by way of example, with reference to the accompanying drawings wherein.

DETAILED DESCRIPTION OF THE PREFERRED EMBODIMENT

Figure 1:
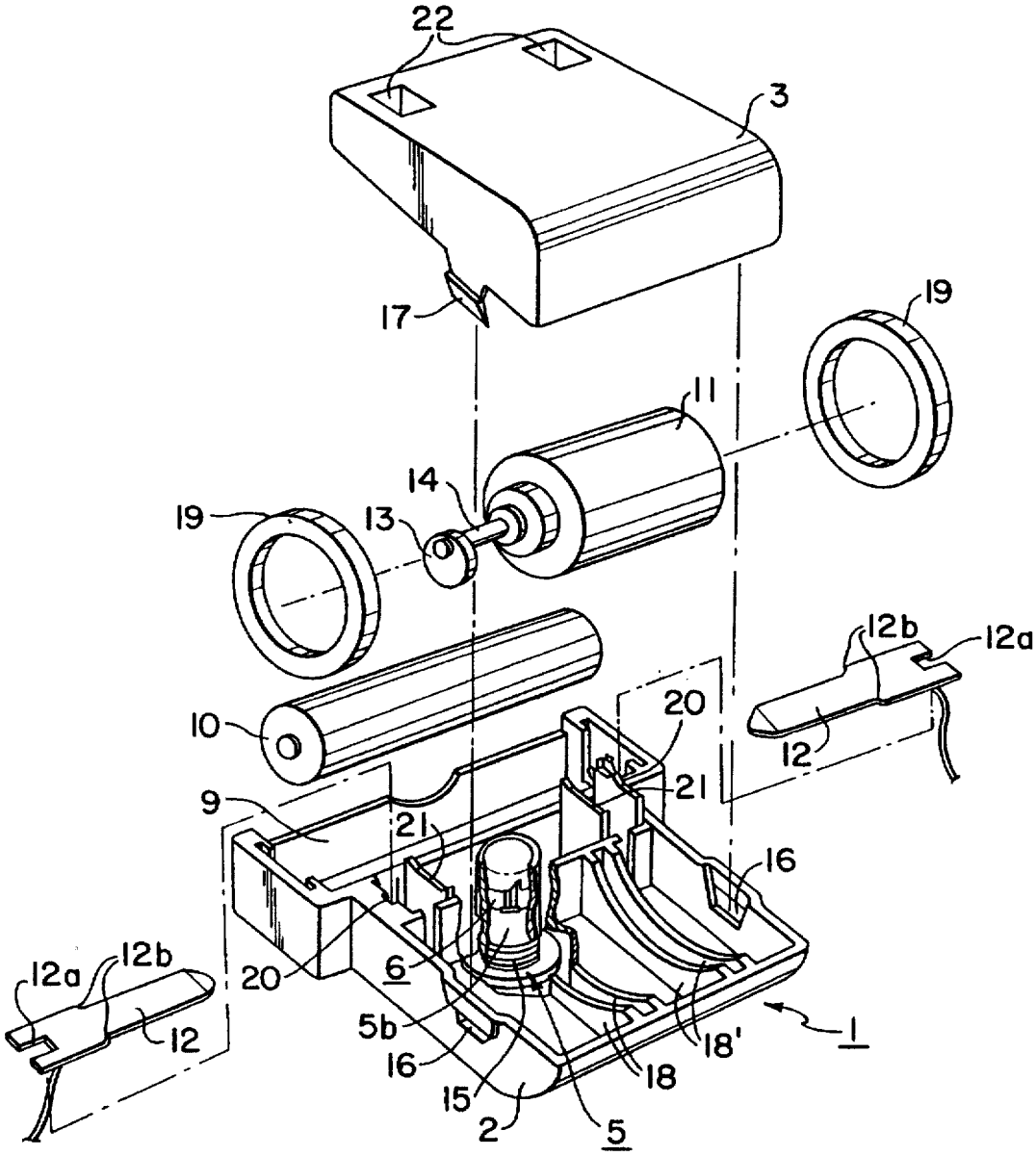
FIG. 1 is an exploded perspective view, partially broken down, illustrating a vibrator in accordance with a first embodiment of the present invention.
Figure 2:
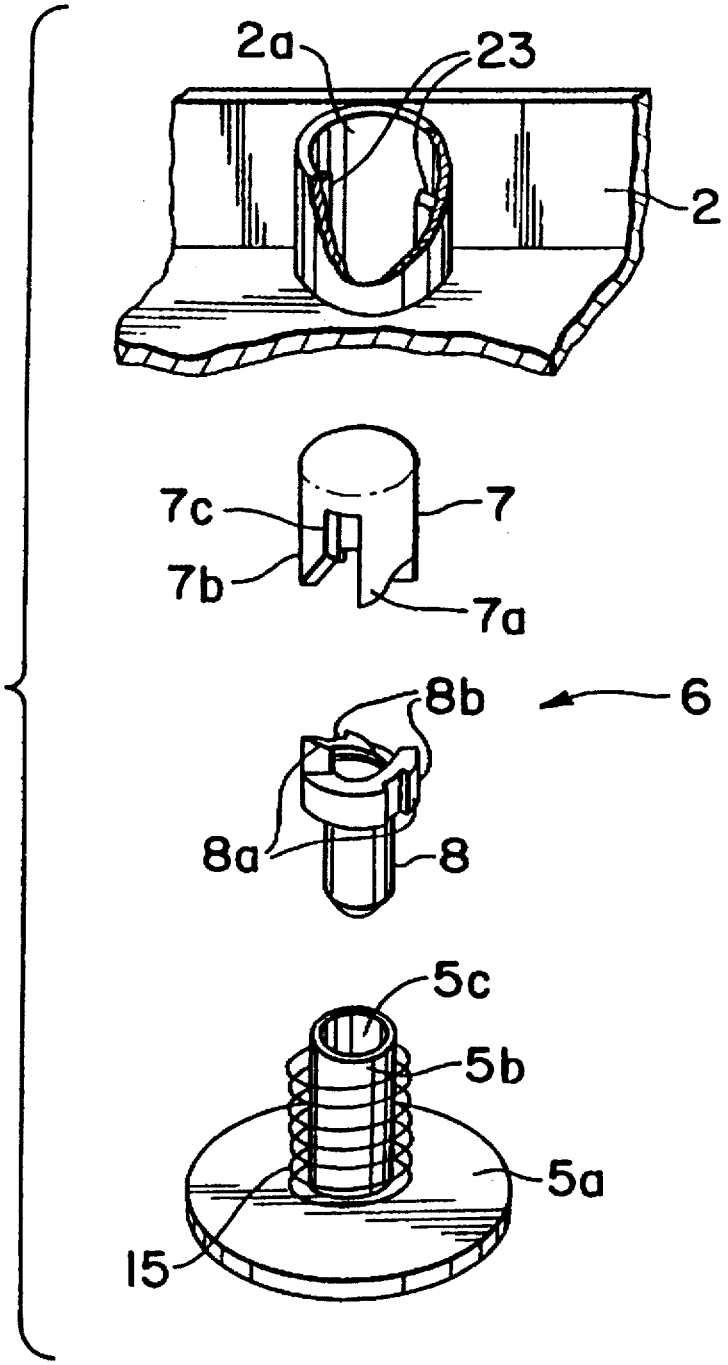
FIG. 2 is an exploded perspective view, partially broken down, illustrating the push button switch mechanism mounted on the push member.

Referring to FIG. 1 and FIG. 2, a movable soft toy, in accordance with the first embodiment of the present invention, comprises a vibrator 1 having an upper cover 2 and a lower cover 3. The vibrator 1 is designed to be mounted on the bottom of the toy body 4 (see FIG. 4) which is shaped like an animal and made of some soft material such as cloth, rubber, or synthetic resin. The toy body may have dyed artificial hair embedded in the outer portion thereof. A push member 5 having a circular push plate 81 on one end of a cylindrical body portion 5b is provided with a push button switch mechanism 6 at the other end thereof. Switch mechanism 6 may be of known design and includes an upper cam 7 and a lower cam 8 installed within a passthrough opening 2a in the bottom of the upper cover 2.

The vibrator also includes a battery housing 9 adapted to receive a battery 10. The housing 9 is formed on both sides of the upper cover 2 and the lower cover 3 adjacent the push member 8. A motor 11 and a pair of switch plates 12 made of conductive material are fitted between the upper cover 2 and the lower cover 3. The switch plates 12 are each formed with an opening 12a and a pair of stepped portions 12b.

Figure 6:
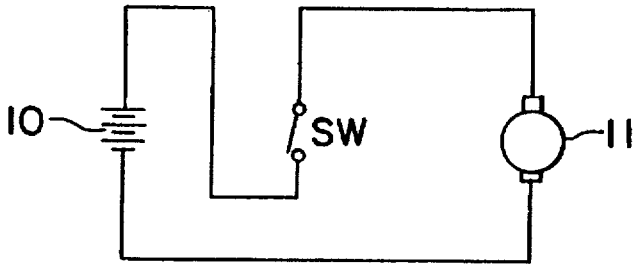
FIG. 6 is a schematic diagram of an electrical circuit used in the embodiments of the present invention.

A circular vibrating member 13 is eccentrically mounted on one end of the motor shaft 14. The switching plates 12 and the push member 5 including the push button switch mechanism 6 form a switch means (SW) to connect and disconnect the motor 11 from the battery 10 (See FIG. 6), thus the vibrator 1 begins to vibrate or stops vibrating. The actual electrical connections schematically illustrated in FIG. 6 are not specifically shown in FIGS. 2, 3 or 4 in order to avoid unnecessarily complicating the drawings. It is clear however that such connections may be easily made by known means.

Figure 4:
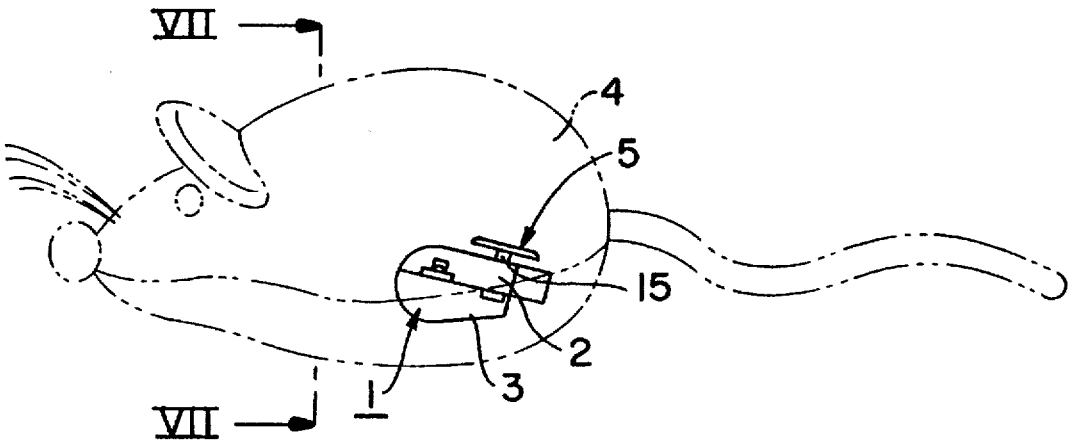
FIG. 4 is a sectional side view, illustrating forward movement of the toy in accordance with the embodiments of the present invention.
Figure 5:
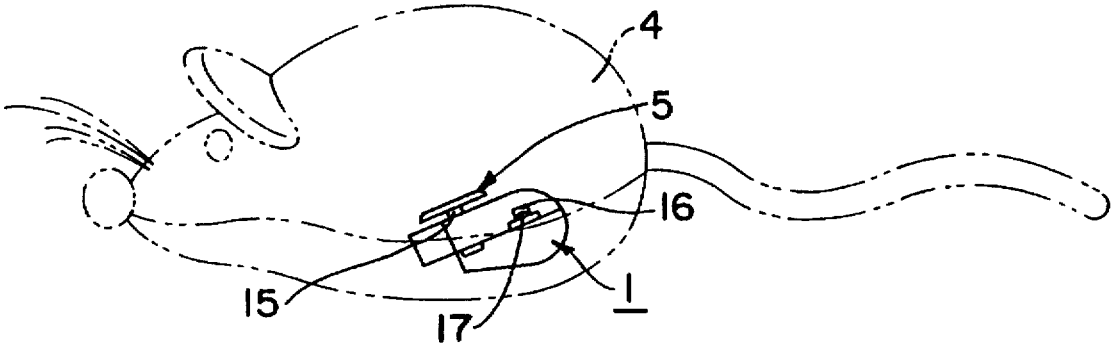
FIG. 5 is a sectional side view, illustrating backward movement of the toy in accordance with the embodiments of the present invention.

A coil spring 15 is resiliently installed around the cylindrical body portion 5b between the push plate 5a and the upper cover 2 as best seen in FIGS. 4 and 5. A pair of locking openings 16 are formed on both side surfaces of the upper cover 2 to receive corresponding locking lugs 17 of the lower cover 3, respectively. In addition, two pairs of mounting flanges 18, 18' are formed on the inner surfaces of the upper cover 2 and lower cover 3 to receive two rubber rings 19 in which the motor 11 is supported.

Further, a guide protrusion 20, which is adapted to receive the opening 12a of the switch plates 12, is formed on both sides of the upper cover 2. A guide groove 21 which is adapted to receive the stepped portion 12b of the switch plates 12 is formed near each guide protrusion 20. The guide protrusion 20 and the guide groove 21 formed on the right side of the upper cover 2 are slightly higher than those formed on the left side of the upper cover 2 to leave a predetermined gap therebetween. Also a pair of guide slots (not shown) to receive corresponding guide protrusions 20 of the upper cover 2 are formed within each recess 22 of the lower cover 3. Accordingly, when the upper cover 2 and the lower cover 3 are assembled, they do not leave any clearance therebetween. Each end of the switch plates 12 is held between its respective guide protrusion 20 of the lower cover 3 and guide slot of the upper cover 2 to maintain the predetermined gap between the other overlapping ends of the switch plates 12.

Referring to FIG. 2, the push button switch mechanism 6 is provided with an upper cam 7 and a lower cam 8. The lower cam 8 is provided with a larger diameter portion having a pair of toothed portions 8a whose surfaces are cut away obliquely, a recess 8b which is formed longitudinally on the periphery thereof, and a smaller diameter portion which is adapted to be fitted within the cylindrical bore 5c of the push member 5. The recess 8b is adapted to cooperate with a stopper 23 formed in the passthrough opening 2a of the upper cover 2 so as to prevent rotation but permit slidable up and down movement.

The upper cam 7 is provided with first and second toothed portions 7a, 7b whose surfaces are also cut away obliquely and a rectangular opening 7c formed between the toothed portions. Therefore, a pair of the toothed portions 8a, 8b of the lower cam 8 may contact preferentially the first or the second toothed portion 7a, 7b of the upper cam 7.

Operation of the first embodiment of the present invention having the above configuration will be explained hereinafter.

When the push plate 5a of the push member 5 provided with coil spring 15 is pressed, the lower cam 8 whose recess 8b cooperates with the stopper 13 moves straight up. The inclined surface of the toothed portion 8a pushes up the first or the second toothed portion 7a, 7b of the upper cam 7. Accordingly, a driving force is produced between the included surfaces of the toothed portions 7a, 7b, 8a to rotate the upper cam 7.

At this time, when the rectangular opening 7c of the upper cam 7 does not coincide with the stopper 23, the toothed portions 7a, 7b of the upper cam 7 are raised on the toothed portion 8a of the lower cam 8 to be maintained in its raised position. Therefore, the raised upper cam 7 pushes the left switch plate 12 up to a predetermined height to contact the right switch plate 12, whereby DC current is supplied from the battery 10 to the motor 11 to rotate motor shaft 14 (see FIG. 6). The vibrating member 13 mounted on the motor shaft 14 rotates to produce vibration induced by the unbalanced rotational moment. As a result, the toy vibrates and appears to be alive.

If the push member 5 is pressed again, the lower cam 8 whose recess 8b cooperates with the stopper 23 again moves straight up. The rectangular opening 7c of the upper cam 7 now coincides with the stopper 23 so that the stopper 23 is slidably received within the opening 7c. Accordingly the upper cam 7 moves down to disconnect the switch plates 12. Therefore DC current from the battery 10 to the motor 11 is cut off, the motor 11 stops rotating and the toy stops vibrating. In other words, the toy in accordance with the first embodiment of the present invention either vibrates or stops vibrating by selectively pressing the push member 5.

Meanwhile, if the vibrating toy is laid on a flat surface such as a floor, it can be moved forward or backward. That is, the vibration induced by the vibrator 1 may change the friction force between the bottom face of the toy body 4 and the flat surface of the floor so that the friction force may vary from a maximum to a minimum value at the bottom face of the toy body 4 where the center of the graving exists. Therefore, the toy itself may be moved forward or backward in the direction upon which the combined forces exert.

When the vibrator 1 is installed within the toy body 4 in which the motor 11, which occupies a major portion of the weight of the vibrator 1, is headed for forward movement, the center of the gravity of the vibrator 1 may be located at front portion of the toy body 4 so that the toy can be moved forward as shown in FIG. 4. When the vibrator 1 is installed within the toy body 4 with the motor 11 being headed for backward movement, the toy may be moved backward as shown in FIG. 5. Therefore, the moving direction of the toy can be selected by changing the location and the mounting direction of the vibrator 1.

The toy in accordance with the first embodiment of the present invention may not move in a straight line because the vibrating member 13 is mounted on only one end of the motor shaft 14. Thus the resultant force is headed in an oblique direction.

Figure 3:
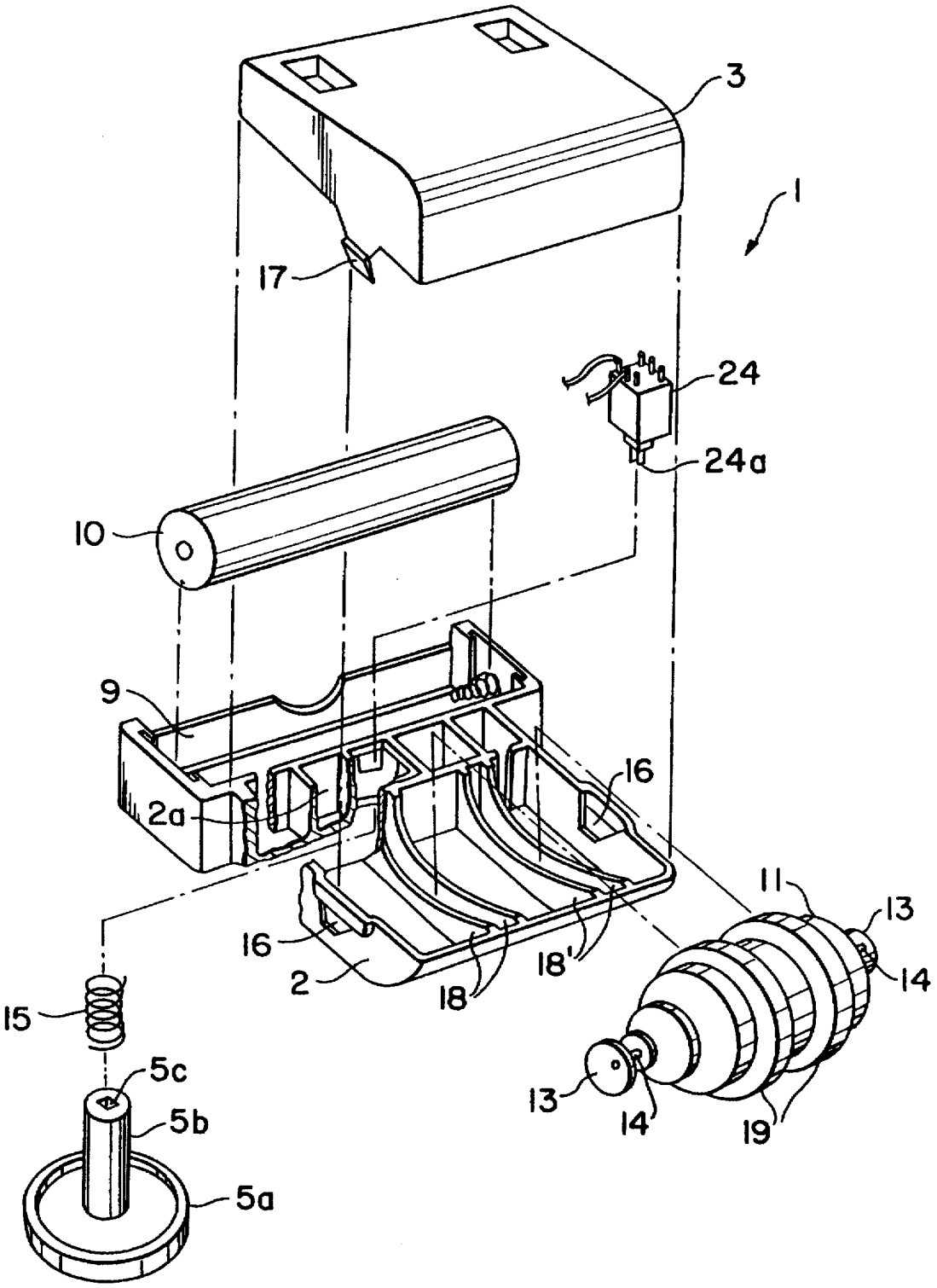
FIG. 3 is an exploded perspective view, partially broken down, illustrating a vibrator in accordance with a second embodiment of the present invention.

To provide additional advantageous features to the first embedment of the present invention, there is shown a second embodiment of the present invention in FIG. 3. The construction of the second embodiment is similar to that of the first embodiment except for the switch means (SW) and the vibrating member 13. Accordingly, the same reference numerals are given to the same components, respectively and detailed description of those now will be omitted. In the second embodiment of the present invention, a vibrating member 13 is mounted on each end of the motor shafts 14, respectively and a spring-loaded push button switch 24 with a protrusion 24a is substituted for switch means (SW) of the first embodiment.

Even through the operation of the second embodiment is similar to that of the first embodiment, the vibrating and moving pattern of the toy may be more stable due to the simple construction of the switch means (SW). That is, the push member 5 is provided with coil spring 15 as in FIG. 1. If the push plate 5a is pressed, the protrusion 24a of the push button switch 24, which is fitted within the rectangular bore 5c, moves up and the push button switch 24 is closed. Then DC current is supplied from the battery 10 to the motor 11 to rotate motor shafts 14. Therefore, the vibrating members 13 mounted on both ends of the motor shafts 14 rotate to produce a uniform vibration induced by the unbalanced rotational moment.

At this time, the rotational moment produced by the opposite vibrating members 13 is symmetrical with the same magnitude and same direction, thereby producing uniform vibration. Therefore, the toy moves in a straight line, forward or backward, owing to the resultant force which is the combined force of the weight of the vibrator 1 and the friction force between the toy body 4 and the floor. As in the first embodiment, the toy can be moved forward or backward by preferentially installing the vibrator with its motor 11 headed for forward or backward motion.

When the push plate 5a of the vibrating try is pressed again, the push button switch 24 opens to stop the vibrating or moving operation of the toy. As described above, if the push plate 5a is pressed again, the toy is vibrated in a forward or backward motion As described above, a movable toy incorporating the principles of the present invention can be vibrated and moved forward or backward in response to the vibration of the vibrating member 13 mounted eccentrically on one or both ends of the motor shafts 14. Thus the toy may induce curiosity in children. Moreover, since the vibrator 1 is mounted within the toy body 4 which can be made of some soft material such as cloth, rubber, or synthetic resin as well as being simple to construct, the toy in accordance with the principles of the present invention can be applicable to any toy, regardless of its shape or material.

Although two specific embodiments have been described above, the scope of the present invention is not in any way limited thereto, and it should be recognized that variations and modifications will readily occur to those skilled in the art. For example, the vibrating members are illustrated as being fixed to corresponding positions of the motor shafts, but each vibrating member can be fixed asymmetrically to the motor shafts. This can produce additional types of vibration and movement.

As indicated above the toy body 4 can be made of soft material. The outer portion of the toy body 4 may have dyed artificial hair imbedded in the surface thereof. Some portion of such hair is shown in FIGS. 4 and 5.

A further feature of the invention is the fact that the bottom portion of the toy body shown in FIGS. 4 and 5 can be made of a smooth surface to reduce the friction force between the toy body and contacting surface such as the floor when the toy is moving. The bottom portion may be made of a synthetic resin such as polyurethane or vinyl, for example.

Figure 7:
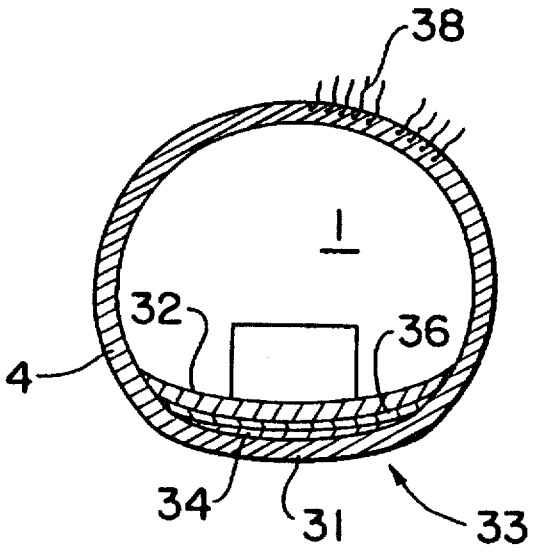
FIG. 7 is a cross sectional view of the toy body token along the line 7—7 of FIG. 4.
Figure 8:
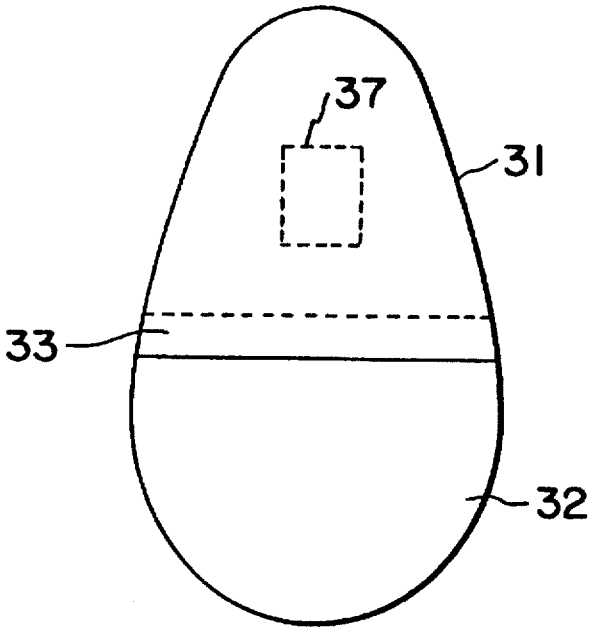
FIG. 8 is a bottom view of the toy body showing the overlapping area of the front and back portions of the bottom portion of the toy body.

In order to insert the vibrator into the inner portion of the toy body 4, the bottom surface of the toy body is provided with front and back portions that are separated. This construction of the toy body may best be seen by referring to FIGS. 7 and 8 of the drawing. FIG. 7 is a cross-sectional view of the toy body taken along the line 7—7 of FIG. 4 while FIG. 8 is a view of the bottom portion of the toy body. In FIG. 8, it can be seen that the bottom surface of the toy body 4 is divided into a front portion 31 and a back portion 31. It can be seen that the front and back portions 31 and 32 respectively overlap in an area 33. The overlapping area can be seen in FIG. 7 in cross-sectional view. The front portion 31 is seen to be below the back portion 32. In the area 33 where the front and back portions overlap there are arranged fasteners 34 and 36. That is the fasteners 34 and 36 are cooperating include mating fasteners such as hook and eye types which provide adhesive-type cooperation but which may be seperated and refastened without affecting the properties of the fasteners. This permits the front and back portions 31 and 32 to be detachably sealed at the overlapping area 33. One such type of fastener that may be used is marketed under the registered trademark "VELCRO".

The advantage of this arrangement is that the vibrator 1 shown in FIG. 7 may be easily inserted into the toy body by separating the front and back portions 31 and 32 of the bottom portion of the toy body. A dotted area 37 is shown in FIG. 8. This area represents one cooperating element of a suitable fastener. The other cooperating element is arranged on the bottom surface of the vibrator 1 so that the vibrator 1 may be detachably secured within the toy body 4.

A further advantage of the separable portions 31 and 32 of the bottom portion of the toy body is that the battery that is used for operating the vibrator 1 may easily be replaced without removing the vibrator or otherwise disturbing the toy. The battery is merely inserted by hand between the separated portions of the front and back portions 31 and 32 and inserted into the vibrator. In the event the vibrator is faulty or a different type of vibrator is desired, the detachably secured vibrator 1 may also be easily removed and replaced.

Also shown illustratedly in FIG. 7 are samples 38 of the dyed artificial hair that may be imbedded in the outer portion of the toy body 4.

It is evident that with the arrangement shown in the drawing that the soft body of the toy may be compressed and the on/off switch of the vibrator contacted by an operator. The toy will then vibrate and move along the floor in an apparently natural manner. The operation of the vibrator and the movement of the toy may be stopped by again operating the on/off switch of the vibrator by compressing the toy body.

The fasteners may be made of pliable plastic and may easily be sewn into the toy body and attached to the vibrator for proper use thereof. The fasteners also come with adhesive tape backing which may be attached to various members for cooperation of the fastening elements.

From the above it can be seen that the various embodiments of the present invention provide advantages over previous toys known in the art. The use of the soft body, the dyed artificial hair and the natural movement of the toy during operation very closely resembles a living animal. This adds greatly to the appreciation of the toy by the user. With the above noted construction, ease of maintenance is also provided so that the battery and/or the vibrator may be replaced very simply.

It should be appreciated that further variations and modifications may also be made without departing from the scope of the present invention which is defined only by the following claims.

What is claimed is:

1. A movable toy adapted for movement along a surface and having a toy body and a vibrator mounted wholly within said toy body, said vibrator comprising:

an upper cover having a pass through opening therein:

a lower cover adapted to be assembled with said upper cover:

a push member including a push plate on one end thereof and a switch means on the other end thereof, said push member being resiliently installed within said pass through opening of said upper cover and adapted to open and close said switch means upon being pressed through pressure on said toy body;

a battery housing mounted in one of said covers and adapted to receive a battery for electrical connection to said switch means:

a motor having a motor shaft extending from at least one side thereof, said motor being mounted in one of said covers and adapted to be energized into rotation by said battery when electrically connected thereto by said switch means; said motor having a pair of rubber rings around its periphery; and at least one vibrating member being eccentrically mounted on at least one end of said motor shaft whereby said movable toy vibrates and independently moves in a predetermined direction along a surface with which it is in contact when said toy body is pressed to close said switch means and stops when said toy body is pressed to open said switch means.

2. A movable toy in accordance with claim 1, wherein said upper and lower covers are formed with two pairs of mounting flanges for said rubber rings on their inner surface, respectively.

3. A movable toy adapted for movement along a contacting surface and having a toy body and a vibrator mounted within said toy body, said toy body having an outer portion in which is embedded dyed artificial hair, a bottom portion having an inner surface and an outer surface, said outer surface being made of smooth material for ease of movement of said toy along a contacting surface, said smooth material is made of a synthetic resin selected from the group of polyurethane and vinyl and said toy body having a head formed with a preselected animal mask.

4. A movable toy as claimed in claim 3 wherein said bottom portion is divided into front and back portions having at least one area where said front and back portions overlap, said front and back portions being arranged with cooperating fasteners in said area to detachably seal said front and back portions in a manner to avoid interfering with the ease of movement of said bottom portion along said contacting surface.

5. A movable toy as claimed in claim 4 wherein said front and back portions may be separated at said overlapping area to permit insertion and removal of elements in said toy body and then resealed.

6. A movable toy as claimed in claim 4 wherein said bottom portion of said toy body has one part of a hook and eye fastener mounted on the inner surface thereof and said vibrator has the cooperating part of said fastener mounted on a surface thereof, said vibrator being detachably mounted in said toy body by the cooperation of said parts of said fastener.

7. A movable toy as claimed in claim 3 wherein said vibrator is provided with an on-off switch that may be operated by contact with said outer portion of said toy body whereby said movable toy vibrates and independently moves in a predetermined direction along a contacting surface when said outer portion of said toy body is pressed to operate said switch into its on position.

8. A movable toy as claimed in claim 7 wherein said on-off switch comprises a spring-loaded push button switch.

9. A movable toy as claimed in claimed in claim 3 wherein said toy body is made of a soft material.

10. A movable toy as claimed in claim 3 wherein said toy body is made of cloth.

11. A movable toy as claimed in claim 3 wherein said toy body is made of synthetic resin.

12. A movable toy as claimed in claim 3, wherein said toy body is made of rubber.

* * * * *